C. R. STURDEVANT.
APPARATUS FOR BRAZING OR WELDING RAIL BONDS.
APPLICATION FILED MAR. 31, 1909.

950,033.

Patented Feb. 22, 1910.

WITNESSES
R. A. Balderson
G. L. Winters

INVENTOR
Chas. R. Sturdevant,
by Bakewell, Byrnes & Parmelee,
his Attys.

UNITED STATES PATENT OFFICE.

CHARLES R. STURDEVANT, OF WORCESTER, MASSACHUSETTS, ASSIGNOR TO AMERICAN STEEL & WIRE COMPANY, OF CHICAGO, ILLINOIS, A CORPORATION OF NEW JERSEY.

APPARATUS FOR BRAZING OR WELDING RAIL-BONDS.

950,033.  Specification of Letters Patent.  Patented Feb. 22, 1910.

Application filed March 31, 1909. Serial No. 486,951.

*To all whom it may concern:*

Be it known that I, CHARLES R. STURDEVANT, of Worcester, in the county of Worcester and State of Massachusetts, have invented a new and useful Apparatus for Brazing or Welding Rail-Bonds, of which the following is a full, clear, and exact description, reference being had to the accompanying drawings, forming part of this specification, in which—

Figure 1:
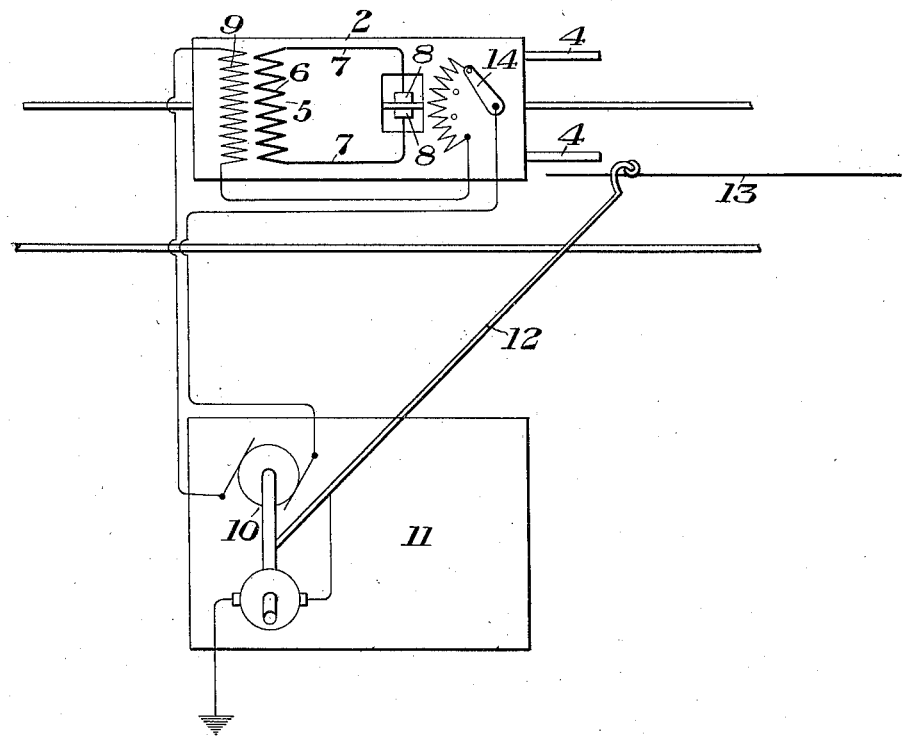
Figure 2:
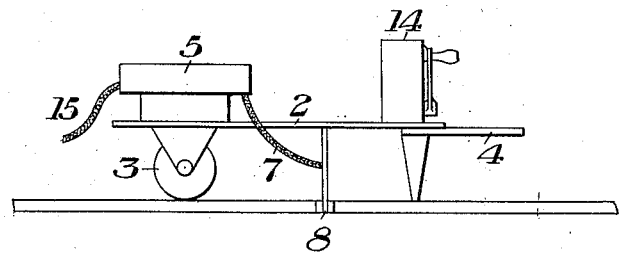

Figure 1 is a diagrammatic view of apparatus embodying my invention, and Fig. 2 is a side view, also partly diagrammatic of the portable car.

My invention has relation to apparatus for brazing or welding rail bonds, and is designed to provide a portable apparatus of a simple character for this work. Heretofore it has been customary to do this work by means of a heavy equipment, consisting of a 4-wheel car carrying a rotary converter, or motor generator, for converting the trolley current into alternating current; and also carrying a transformer, regulating devices and brazing electrodes, the whole weighing several tons. On railway tracks where the service is frequent, much time is consumed in removing this apparatus from the track every time a car passes; and consequently it has been necessary to do most of the work on such tracks at night when there is comparatively little or no traffic. My present invention overcomes this difficulty by providing apparatus in which the only part which is mounted upon the track rails is a small and comparatively light car or vehicle, which can be readily removed from the track to permit a car to pass, and replaced in position with very little loss of time.

The nature of my invention will be best understood by reference to the accompanying drawings which will be hereinafter described, it being premised, however, that various changes may be made in the details of construction and arrangement of the parts without departing from the spirit and scope of my invention, as defined in the appended claims.

In these drawings, the numeral 2 designates a light car frame, having a single supporting wheel 3 adapted to travel upon one of the track rails, and also provided with suitable handles 4. This car is adapted to be run along one rail of the track which is being bonded, and can easily be handled by one or two men. Supported on the frame 2 is a welding transformer 5 having its secondary coil or winding 6 connected by suitable conductors 7 with the brazing or welding electrodes 8, which grip the rail and bond in any suitable manner.

The primary coil or winding 9 of the transformer 5 is connected to a motor generator 10 which is mounted on a separate vehicle 11 which may be adapted to travel on the street surface or pavement at one side of the car tracks. This vehicle 11 may be drawn by animals, or it may be self-propelled in the manner of an automobile, or it may be a small 4-wheel car, temporarily set to one side of the track and used as a portable substation. It is either provided with a trolley pole 12, which is adapted to make contact with the upper side of a trolley wire 13, whereby a direct current is supplied to motor generator, or with a prime mover such as a gasolene engine which drives the alternator direct. This direct trolley current is converted into alternating current which is delivered to the primary winding 9 of the transformer 5.

14 designates any suitable regulator which may be mounted on the frame 2, and by means of which the brazing current may be regulated. In the drawing I have shown this regulator as consisting of a rheostat connected in series with the motor generator. The wires connecting the transformer and regulator with the separate vehicle 11 can be readily brought together in the form of a flexible cable of any suitable length, as indicated at 15 in Fig. 2.

The special trolley pole 12 will not interfere with traffic, and the vehicle 2 can be quickly lifted from the track rail to permit a car to pass and can be as quickly replaced. This permits the brazing or welding operations to be carried on with a minimum loss of time due to the passage of the regular traffic on the car tracks, and also interferes but little with such traffic.

It will be obvious that various changes may be made in the character and construction of the vehicle 2; that the vehicle 11 may be of any suitable character; and that various changes may be made in the electrical apparatus mounted upon these vehicles without departing from the spirit and scope of my invention, as defined in the claims.

What I claim:

1. Apparatus of the character described, comprising a light vehicle adapted to travel on a single track rail, brazing or welding electrodes carried thereby, a welding transformer mounted thereon, a separate vehicle adapted to travel or to be set temporarily at one side of the track, apparatus on said vehicle for furnishing the transformer with current, and flexible conductors connecting said apparatus with the transformer; substantially as described.

2. Apparatus for the purpose described, comprising a comparatively light car, having a single supporting wheel and adapted to run on a single track, brazing or welding electrodes carried thereby, a transformer and current regulating means mounted thereon, a separate vehicle adapted to travel at one side of the track being bonded, apparatus mounted on the vehicle for supplying current to the transformer, and flexible conductors connecting the vehicle with the said car; substantially as described.

3. Apparatus of the character described comprising a light car or vehicle arranged to be run on a track rail and provided with brazing or welding electrodes, a separate vehicle adapted to travel or to be set temporarily at one side of the track upon which the first named car or vehicle is supported, apparatus on said separate vehicle for supplying the electrodes with current, flexible conductors connecting the two vehicles, and a trolley connection between the separate vehicle and the overhead trolley wire which supplies propulsion current for traffic on the track of which said track rail forms a part; substantially as described.

In testimony whereof I have hereunto set my hand.

CHARLES R. STURDEVANT.

Witnesses:
WM. A. BACON,
G. LAMPSON.